ROTARY FINDER WITH GRADED MULTIPLE

Filed March 27, 1953 5 Sheets-Sheet 1

INVENTORS.
KENNETH W. GRAYBILL
CLARENCE E. LOMAX
BY Wm. Walter Owen
ATTY.

ROTARY FINDER WITH GRADED MULTIPLE

Filed March 27, 1953 5 Sheets-Sheet 2

NOTE: ALL TEST CONDUCTORS CORRESPONDING TO 155 IN FINDERS MULTIPLED TO EACH OTHER ARE TIED TOGETHER.

ALLOTTER 200

INVENTORS.
KENNETH W. GRAYBILL
CLARENCE E. LOMAX
BY Wm Walter Owen
ATTY.

INVENTORS.
KENNETH W. GRAYBILL
CLARENCE E. LOMAX
BY Wm Walter Owen
ATTY.

INVENTORS.
KENNETH W. GRAYBILL
CLARENCE E. LOMAX
BY Wm. Walter Owen
ATTY.

ROTARY FINDER WITH GRADED MULTIPLE

Filed March 27, 1953 5 Sheets-Sheet 5

ALLOTTER 500

INVENTORS.
KENNETH W. GRAYBILL
CLARENCE E. LOMAX
BY Wm. Walter Owens
ATTY.

United States Patent Office 2,769,863
Patented Nov. 6, 1956

2,769,863

ROTARY FINDER WITH GRADED MULTIPLE

Kenneth W. Graybill, Elmhurst, and Clarence E. Lomax, Chicago, Ill., assignors to Automatic Electric Laboratories, Inc., Chicago, Ill., a corporation of Delaware Application March 27, 1953, Serial No. 345,028

28 Claims. (Cl. 179—18)

Figure 1:
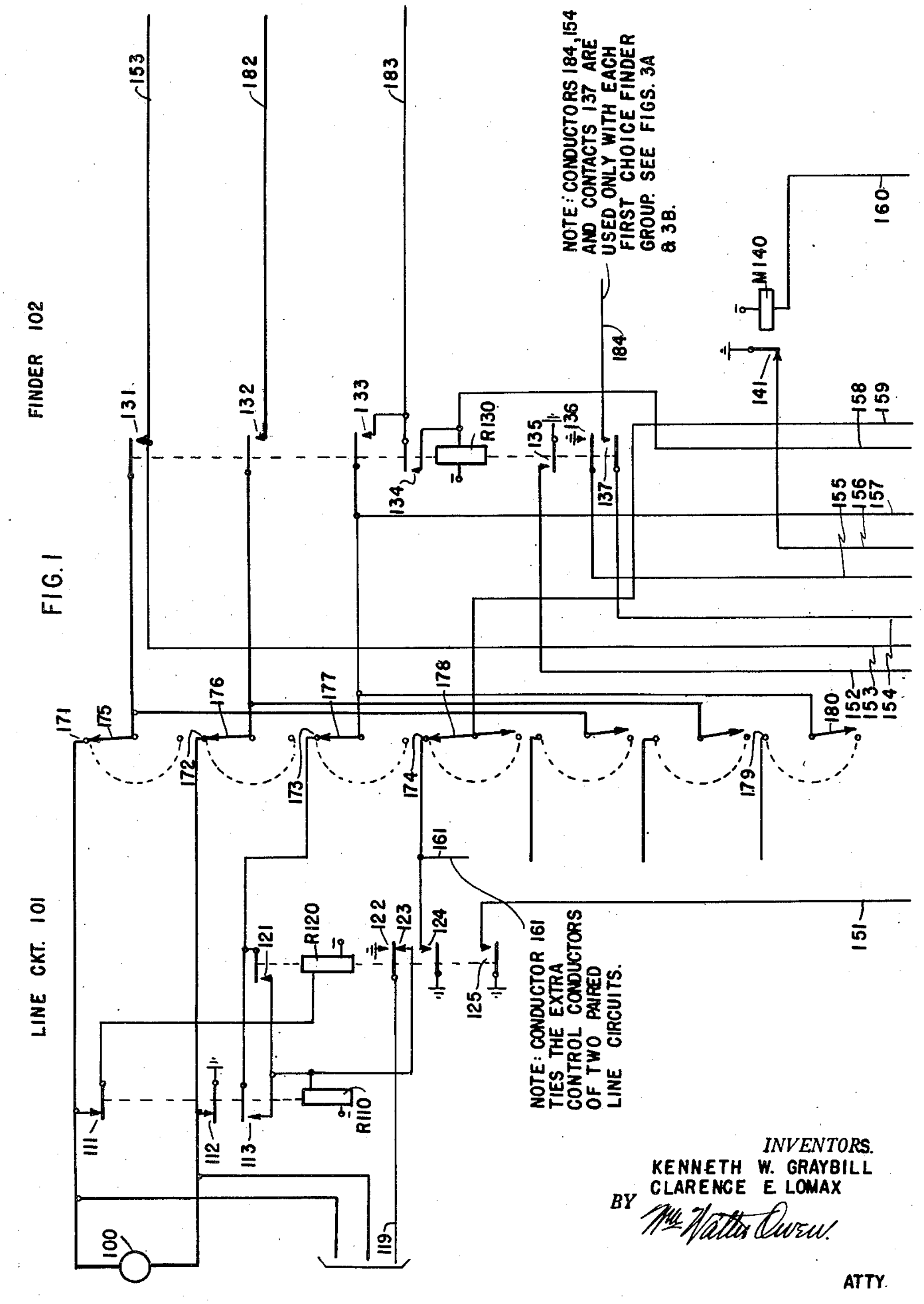

This invention relates to telephone systems and more particularly to line, linefinding and allotting arrangements therein.

For a preferred embodiment, as shown in the attached drawings, applicant has selected an arrangement wherein a plurality of groups of numerical switches are accessible in a definite order of priority, in which order said groups are accessible from successively larger groups of subscriber lines. This arrangement is of particular economic advantage in large exchanges, wherein it is proposed to reduce to a minimum the number of expensive numerical switches required for a predetermined grade of service by using a greater number of inexpensive, single-relay, small-capacity rotary finder switches. As a result of extensive analysis, it is thought that the greatest economy is achieved when 50 point finders are utilized.

The graded multiple (or partial multiple if first choice finders are not multipled) is not new in the art, and applicant's arrangement of switches is similar to that shown in the Aitken Patent No. 1,740,559. However, maximum grade of service for a given arrangement cannot be obtained in Aitken's system since it is possible to take into use a second choice selector while a first choice finder-selector link is idle. Aitken's individual finders are available in a definite order of priority while applicant's groups of finders are available in a definite order of priority. In applicant's arrangement, a second choice selector will never be taken into use if, at the moment, a first choice link is idle. Maximum efficiency is therefore attained by applicant's structure during heavy traffic periods.

Further, as a result of applicant's arrangement, a non-homing allotter can be used and finder switches can be mixed and slipped. Consequently wear and tear on the allotter is reduced to a minimum, and a more equalized load on all trunks is obtained.

Particular attention is drawn to the flexibility of applicant's allotting arrangement. Any finder may be changed from one group to another with no other alteration in the allotter than properly marking its contacts which are accessible to the group test wipers. Also the number of groups to be available to an allotter is easily changed by the mere addition or deletion of a group test bank and the test wiper and test relay associated therewith.

Also in keeping with the use of an inexpensive finder switch, control circuits common to all switches accessible from a group of lines have been incorporated into the allotter.

In the past, trouble has been encountered in the problem of providing a positive means for stopping the finder wipers on the calling line and only on the calling line. This problem is eliminated by applicant's use of a new and novel double test, one to stop the wipers, the other to switch through if the wipers stop on a calling line and to advance the wipers after a short delay if they have stopped on a non-calling line. This problem was especially acute in systems employing absence of ground searching for the purpose of assuring reliable control of high speed switches. With absence of ground searching, an open ground contact on the line relay or removal of ground from the bank contact of an unequipped line caused the finders to stop on the line, lock up, and thereby be put out of service; also it was necessary that stopping ground be opened at both the line and cut-off relays to prevent the finder from locking up at the termination of a call, and in spite of this rather expensive solution there was no definite assurance that the finder would release prior to the line equipment to prevent locking up. Applicant's apparatus eliminates these problems in one of its forms.

It is an object of this invention to provide a new and novel means for allotting automatic switches for use.

A further object of this invention is to provide a new and novel means for controlling a finder switch as it hunts for a calling line.

A feature of this invention is the new and novel method of selecting switches from one group and of skipping over switches in other groups as desired.

A further feature of this invention is the ultimate flexibility of the alloting equipment so that altering the grouping of finders becomes a relatively simple task.

A further feature of this invention is the rapidity with which a calling line is found even though any one of several finders in different groups may be used.

A further feature of this invention is the use of one group of allotter bank contacts for terminating the guard leads of all finders accessible thereto; and, for each finder group except one, an additional group of bank contacts for skipping over the finders therein.

A further feature is the new and novel means by which the finder stops on a calling line and switches through.

A further feature is the new and novel means for kicking the finder off a non-calling line upon which it has stopped.

Figure 2:
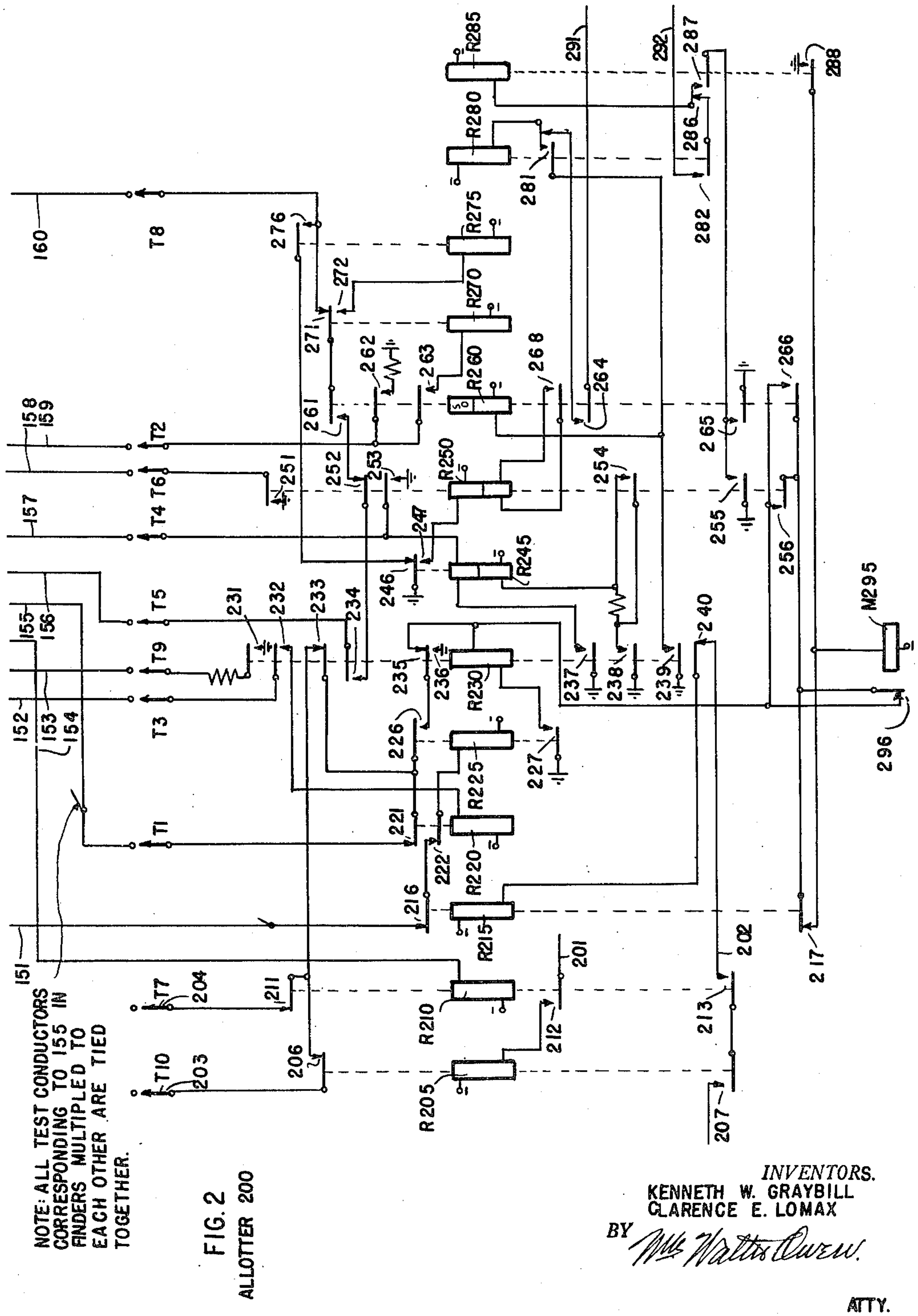
Figure 3A:
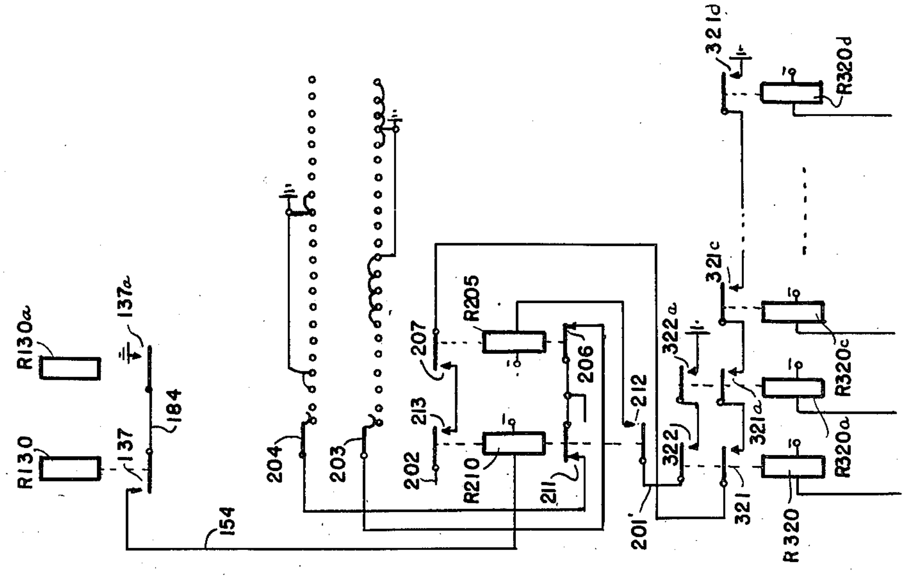
Figure 3:
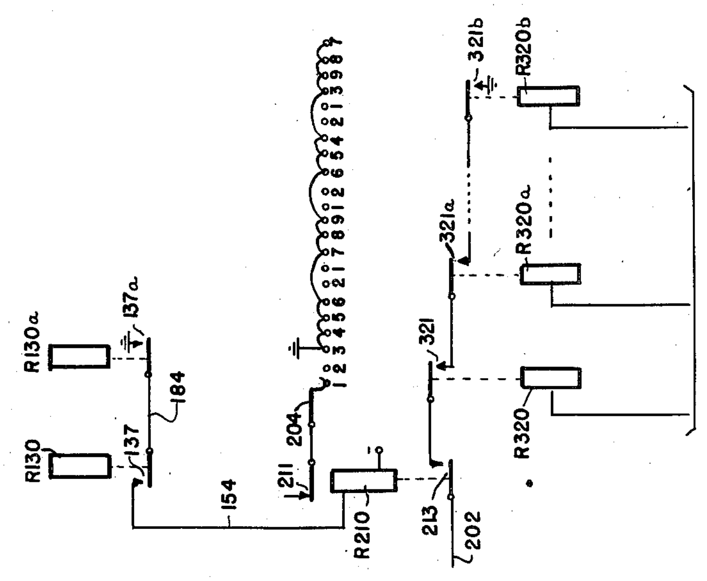
Figure 4:
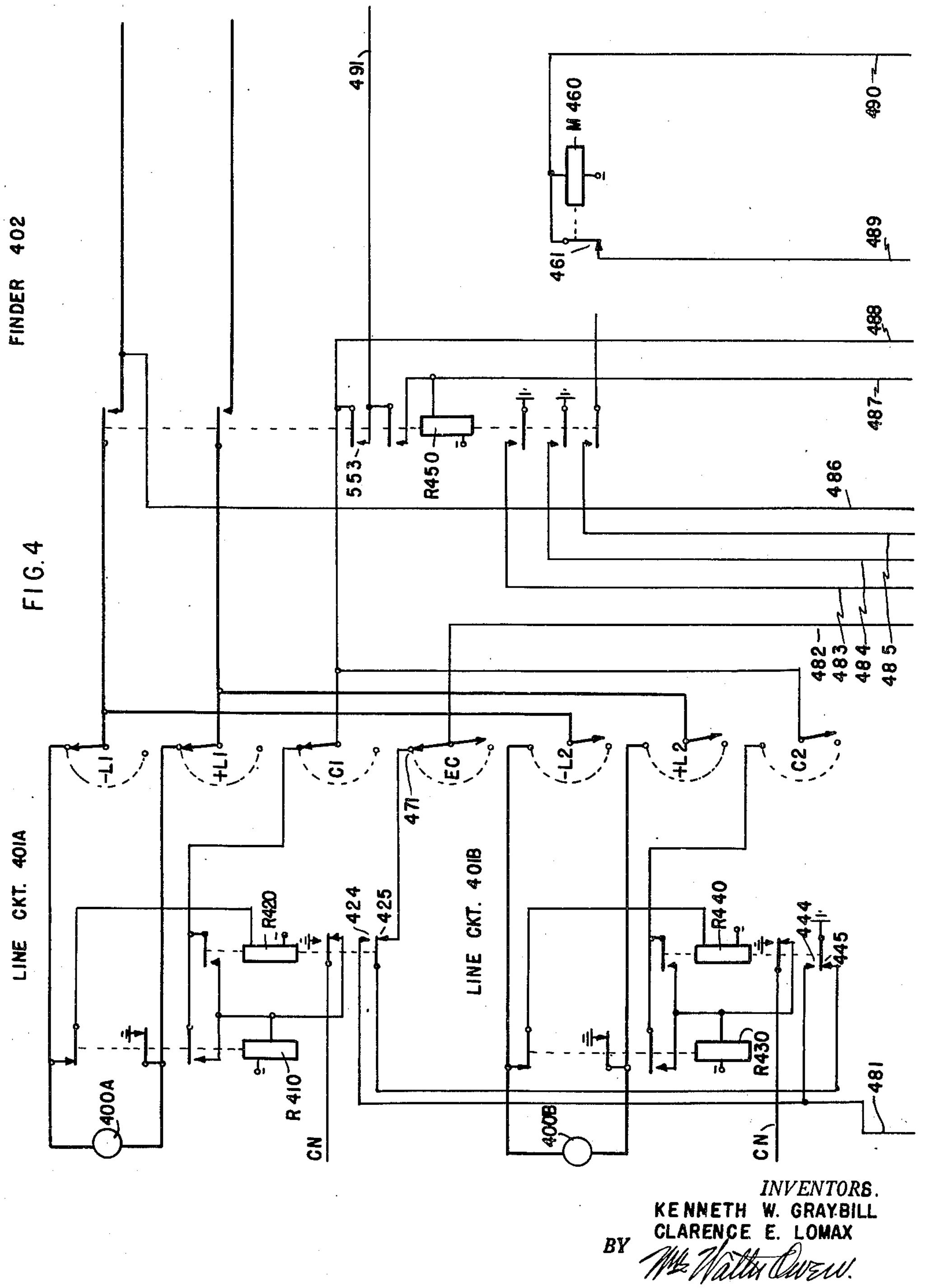
Figure 5:
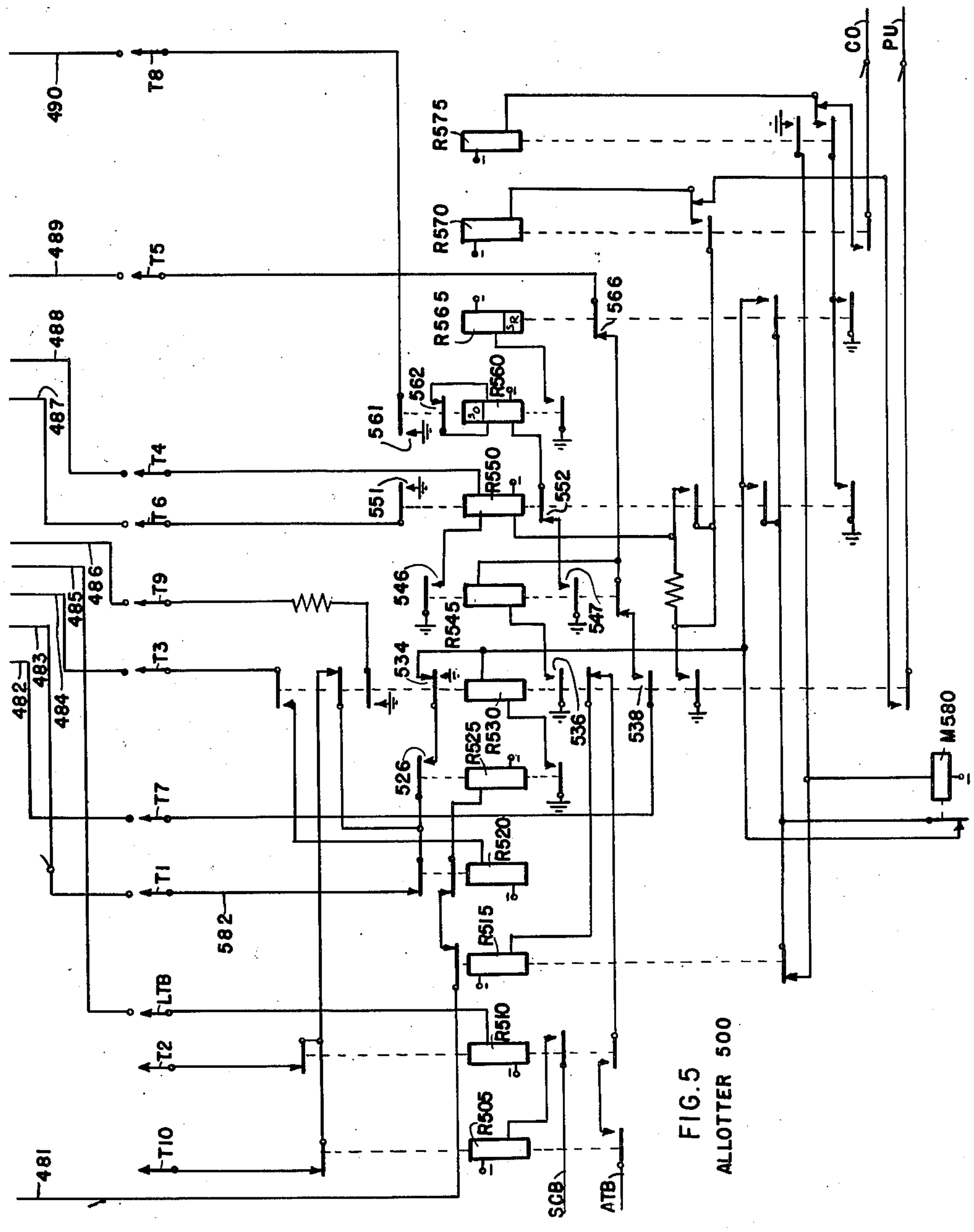

Further features of this invention will be evident upon a perusal of the following disclosure in which:

Fig. 1 shows a subscriber substation, a line circuit individual thereto, and a finder switch;

Fig. 2, an allotter associated with said subscriber line and finder;

Fig. 3, details specific to the grading and mixing of finder switches accessible to the allotter of Fig. 2 if only first and second choice switches are available;

Fig. 3A, details specific to the grading and mixing of finders in a system utilizing first, second and third choice finders;

Fig. 4, two subscriber substations, a line circuit individual to each, and a finder switch for use with said line circuits; and Fig. 5, an allotter designed for use with said last-mentioned line circuit and finder.

These circuits show how a group of finders can be allotted in first and second choice groups or in first, second and third choice groups. The first choice trunks are so arranged that each finder has its own individual selector. The second and third choice trunks have the finders effectively in multiple with other finders in other groups so that one selector must serve two or more finders. This arrangement has been formerly referred to as a graded multiple. It could, however, be called a partial multiple because the first choice finders are not multipled. Its greatest merit is attained when there are a great number of groups to grade and multiple.

It will be noted that finder 102 and allotter 200 are designed for use with line circuit 101, while finder 402 and allotter 500 are designed for use with line circuits 401A and 401B. With respect to allotting the finder switches for use, both systems are identical for all practical purposes. However, the two systems differ substantially with respect to the means used for finding a calling line. Both utilize a double test when searching for a calling line; and, unless both tests are met, the wipers will be advanced. However one searches for ground and battery and requires an interrupter relay to stop the wiper movement. The other searches for absence of ground and battery, the necessity of an interrupter relay being eliminated.

Referring more particularly to Figs. 1, 2, 3 and 3A, the line circuit 101 is similar to conventional circuits except that an extra-control conductor has been introduced, the said extra-control conductors of two paired line circuits being made common to both circuits. The usual private conductors are individual to each circuit. The extra-control conductor is utilized to stop the finder motor magnet when it hunts for a calling line, and the private conductor is utilized to make a test to determine if the line upon which the finder has stopped is the calling line and to again initiate the hunting process if said line is not the calling line.

It will be noted with respect to the finder 102 that conductor 154 will appear only in the first finder of each first choice finder group and, as shown in Fig. 3 is extended by means of conductor 184 and contacts on each switching relay—i. e. R130 and R130*a*—of each first choice finder to ground on contacts of the last of said first choice finders. The circuits are similar if first, second, and third choice finders are used as shown in Fig. 3A.

As noted in Fig. 2, each multipled finder group has its busy test leads (e. g. 155) strapped together so that, if one finder in the group is in use, all multipled therewith are busy marked.

To achieve the maximum in economy, the finder switches, in view of a rather liberal use thereof, have been stripped of all control and operating equipment except the switching relay and the motor magnet for driving its wipers. The control circuits, common to all finders accessible from a group of lines, have been incorporated in the allotter associated with said group of lines.

The finders 102 and 402 may be connected to any one of several well known selectors, such as that shown in the Newstedt Patent No. 2,529,409, having three incoming conductors and a line relay which can be operated if ground is placed on one of said conductors.

Group switching relay R210 shown in Fig. 2, Fig. 3 and Fig. 3A is operated only when all first choice finders accessible to allotter 200 are busy; and, when operated, renders second choice finders associated therewith available for use.

Group switching relay R205, which will be used in the allotter only if third choice finders are available thereto, is operated only when all first choice finders and all selectors associated with second choice finders accessible to allotter 200 are busy; and, when operated, renders third choice finders associated therewith available for use.

If, subsequent to the operations of R210 and R205, a first choice finder accessible to allotter 200 becomes idle, both relays will restore. Similarly if a second choice finder became idle R205 would restore. As a result, no finder may be taken into use if a finder in a group of preceding priority is idle.

Associated with the allotter is a kick-off feature of a type well known in the art wherein a timing device (not shown), common to all allotters, transmits an impulse over conductor 291 to operate timing relay R280 and an impulse over conductor 292 to operate kick-off relay R285. If the finder has switched through a call received during the time interval of two pulses, thereby to open contacts 264, R285 will not operate; but, if the call is not switched through, R285 will operate and at contacts 288 complete a path to operate the allotter motor magnet, said magnet stepping the allotter wipers to the next accessible finder. In this manner, defective finder switches are by-passed.

When all selector switches associated with finders which are accessible to allotter 200 are busy, relay R215 will be operated over all-trunks-busy conductor 202 to operate contacts 216, to open the allotter start circuit, thereby to prevent needless wear on the allotter.

Referring more particularly to Fig. 3, part of the bank contacts accessible to wiper 204 are shown and each is numbered according to the finder switch with which it is associated. It will be noted that finders 1 and 2 are first choice finders, that finders 3 to 9 are second choice finders, and that said finders are mixed for more even distribution of calls and to reduce wear and tear on the allotter. The relays R320, R320*a* and R320*b* are relays in the selectors associated with second choice finders, which relays are operated when the selectors associated therewith are busy. The switching relays in the selectors may be used for this purpose. The operation of a system utilizing only first and second choice finders will not be described because said operation is shown with respect to the description of a system utilizing third choice finders also.

As shown in Fig. 3A, the bank contacts, accessible to wiper 204 and associated with second choice finders, are permanently grounded; and the bank contacts, accessible to wiper 203 and associated with third choice finders, are permanently grounded. Relays R130 and R130*a* are the switching relays of the two first choice finders available to allotter 200. Relays R320 and R320*a* are the switching relays of the selectors associated with the second choice finders available to said allotter; and relays R320*c* and R320*d* are the switching relays of the first and last of the selectors associated with the third choice finders available to said allotter.

The equipment shown in Figs. 4 and 5 resembles that shown in Figs. 1 and 2 except for circuit details to provide for absence of ground searching by the finder.

*Searching for a calling line—use of a double test*

A more complete description of the system will now be made. If a subscriber initiates a call from substation 100, the line relay R120 of line circuit 101 will be operated over an obvious circuit including the calling line. At contacts 124, the extra-control contact 174 is grounded; at contacts 122, ground on conductor 119 busy marks the calling line at the connector banks; at contacts 121, battery over the cutoff relay R110 is placed on the private contact 173; and, at contacts 125, ground over the allotter start lead 151 operates the start relay R225.

Contacts 226 operate more rapidly than contacts 227 so that, if the finder—e. g. 102—presently held by allotter 200 is not to be taken into use, R230 will be short circuited by ground on contacts 235 over conductor 155 and thereby be prevented from operating. Assuming, however, that ground is not extended to contacts 235 when contacts 226 close, R230 will operate in series with M295 when contacts 227 close; but M295 will not operate. At contacts 231, R230 completes a start circuit over conductor 153 for operating the line relay of the selector switch associated with finder 102. Ground from the selector will be placed on private conductor 183 in a well known manner, but this is of no effect as yet. At contacts 232, a circuit is prepared for operating release relay R220; at contacts 233, the second and third choice test circuits are opened; at contacts 234, a circuit for operating the finder motor magnet M140 is prepared; at contacts 236, ground is placed on test lead 155 so that, if finder 102 is multipled with other finders, all will be busy marked; contacts 235 open to remove the path for shorting R230; at contacts 237, a test circuit is prepared; at contacts 238, a circuit for pre-energizing, but not operating, test relay R245 is completed; at contacts 239, a circuit for operating slow-to-operate relay R260 is completed; and at contacts 240, all-trunks-busy conductor 202 is opened.

If the contacts upon which the finder wipers are standing are contacts 171, 172, 173 and 174, battery over private contact 173 and conductor 157 will operate test relay R245 before R260 can operate; at contacts 246, opens an already open circuit for operating M140; and at contacts 247, completes a circuit for operating relay R250. At contacts 251, R250 completes a circuit over conductor 158 for operating the finder switching relay R130; at contacts 252, opens a circuit for operating M140; at contacts 253, completes a circuit over conductor 157 and contacts 121 for operating cutoff relay R110; and at contact 254, completes a circuit for holding R245 operated. It will be noted that R250 must operate prior to the operation of R260 so as to prevent M140 from operating after R260 operates. R260 now operates followed by a possible operation of R270 but this is of no consequence at this time.

When R130 operates in response to the operation of R250, it switches through connections from line circuit 101 to the selector associated with finder 102; locks itself operated over a circuit including contacts 134 and conductor 183; at contacts 136, places ground on conductor 155 to busy mark finder 102 and any finder multipled therewith; if finder 102 is a first choice finder, contacts 137 are closed to prepare a circuit over conductor 154 to second choice relay R210; and at contacts 135, completes a circuit over conductor 152 for operating release relay R220.

When R110 operates in response to the operation of R250 (R110 may be operated in series with R245 if desirable), it opens contacts 111 and 112 to restore R120, and locks itself operated over contacts 113, 173, 133 and grounded conductor 183. When R120 restores, ground from conductor 183 is extended to conductor 119 through 113 and contacts 123 to busy mark the calling line; and ground is removed from the extra-control contact 174 at contacts 124 and from the allotter start lead 151 at contacts 125.

If no other calls are waiting, allotter 200 will restore to normal without advancing its wipers because R220 does not restore to prepare the operating circuit for M295 until after R225 restores to open contacts 226.

The calling line has been extended to the selector associated with finder 102, and the equipment is now ready for dialing.

If the finder wipers had been standing on contacts other than those associated with substation 100 when R230 operated, then R245 and R250 would not have operated. R260 operating after a short time delay will complete at contacts 261 a self-interrupting circuit, including conductors 156 and 160, for operating motor magnet M140; at contacts 262 and 263, close a pre-energizing circuit for interrupter relay R270; and at contacts 263, prepare a circuit for operating R270.

M140 will step the finder wipers to succeeding bank contacts until ground on an extra control contact quickly operates the partially energized relay R270 over conductor 159, which relay interrupts the magnet operating circuit at contacts 271.

If the contacts upon which the wipers stop are those associated with the calling line, R270 operates from ground over contact 174 and conductor 159; and R275 operates from ground over conductor 156 and contacts 272; but pre-energized relay R245 operates before M140 can energize over conductor 160 and contacts 276 and 246.

If the wipers stop on contacts other than those associated with substation 100 (i. e. contacts of the line circuit paired with line circuit 101 and therefore having a common extra-control contact 174 or contacts of an idle line circuit with its contacts corresponding to contacts 124 defective and closed), then battery will not be found on the private contact thereof even though ground is found on the extra-control contact; relay R245 will not operate, relay R275 will be operated from ground over conductor 156 and contacts 272; and M140 will then energize over a circuit including conductor 160 and contacts 276 and 246. M140, operating contacts 141, restores R275; M140 restores to move the wipers one step to the next contacts. If the next contacts are not those associated with the calling line, R270 will restore and the wipers will be stepped until the calling line is seized. If said next contacts are those associated with the calling line, pre-energized relay R245 operates to open contacts 246 before M140 can again energize. When the calling line is seized and R245 is operated rapidly, further operation will be the same as previously described.

If, when R110 and R130 operate after the calling line is found, another call is waiting, conductor 151 will continue to be grounded from the line circuit associated with said other call. R225 will restore in response to the operation of R220; R230 will then restore; R220, R260 and R245 will restore in response to the restoration of R230; R250 will restore; R270 will have restored after R120 restored. The allotter is now at normal with its start lead 151 grounded; R225 will operate as before; but now ground over test conductor 155, contacts 235 and self-interrupting contacts 296 of motor magnet M295 will operate said magnet thereby to advance the allotter wipers to the contacts of the next accessible finder. If R225 reoperates before R250 or R260 restore, the self-interrupting contacts 296 will be shorted by contacts 256 or 266 so that the magnet M295 cannot restore to advance the wipers until after both R250 and R260 restore. The winding of R230 is short circuited during the energization of M295, and its operating circuit is held open at operated contacts 296 until M295 restores. If said next accessible finder or one multipled therewith is busy, a similar circuit for operating M295 will be completed to again advance the allotter wipers. This operation will be repeated until an idle finder is seized.

It will be noted that if battery were falsely connected to the private contact of an idle line—e. g. contacts 113 stick together—then R245 will be operated even though M140 steps the wipers over said line. R245 would start to restore if the next line were idle but might remain energized long enough to operate R250 which would lock R245 operated and open the operating circuit of M140 at contacts 252 to stop the wipers on said next line. The heavy spring load on R250 may prevent R250 from operating before R245 restores; however, another winding, which is short circuited when R260 operates contacts 268, causes R250 to be slow to operate, thereby to assure a restoration of R245 before R250 can operate.

*Selection of second and third choice finders*

Assume a partial multiple system wherein each group of lines has access to two first choice finders, two second choice finders each of which is multipled to second choice finders of other groups, and five third choice finders each of which is multipled to third choice finders of a greater number of other groups. Each second and third choice finder is associated with a selector in common with the finders multipled therewith. Fig. 3A shows the allotter bank wiring as regards second and third choice test wipers 204 and 203 respectively. It will be noted that those contacts accessible to wiper 204 and associated with second choice finders are grounded and that those contacts accessible to wiper 203 and associated with third choice finders are grounded.

It is apparent that, when start relay R225 of allotter 200 operates in response to a call, ground over test wiper 204 and contacts 233 and 235 will operate motor magnet M295 to advance the allotter wipers if said wipers are standing on a second choice finder or thereafter seize a second choice finder, unless said circuit is opened at contacts 211. As shown in Fig. 3A, a circuit for operating second choice group switching relay R210 is completed by way of contacts 137 and 137*a* of the first choice finder switching relays R130 and R130*a* when both of said finders are in use. Therefore contacts 211 of second choice relay R210 are operated to open said last-mentioned circuit for operating M295 only when both first choice finders are busy. It will be apparent, therefore, that second choice finders may be taken into use only after all first choice finders are in use.

Similarly ground over test wiper 203 will operate M295 when a call is initiated if the wipers are standing on a third choice finder or thereafter seize a third choice finder unless contacts 206 are operated to open said test wiper. As shown in Fig. 3A, third choice group switching relay R205 is operated only after second choice relay R210 and switching relays R320 and R320*a* of the selectors, associated with the two second choice finders, are all operated. Therefore, contacts 206 of third choice relay R205 are operated to open third choice wiper 203 only when all first and second choice trunks are in use. It will be apparent, therefore, that third choice finders may be taken into use only after all first and second choice trunks have been taken into use.

It will be further noted that, if second choice finders have been made available for use and thereafter either first choice finder becomes idle, R210 wil restore to close contacts 211 to again prevent said second choice finders from being taken into use. Similarly, if third choice finders have been made available for use and thereafter a trunk associated with a first or second choice finder becomes idle, R205 will restore to close contacts 206 to prevent said third choice finders from being taken into use.

When all trunks available to a group of lines become busy, ground over operated contacts of the switching relays of all second and third choice selectors (four of which are shown in Fig. 3A—i. e. R320, R320*a*, R320*c* and R320*d*) over operated contacts on the second and third choice relays—i. e. R205 and R210—and over all trunks busy conductor 202 will operate all trunks busy relay R215. R215 operates contacts 216 to prevent use of the allotter, thereby to reduce needless wear on the allotter.

*Absence of ground searching for high speed switches*

Except as otherwise noted the operation of the equipment shown in Figs. 4 and 5 will be similar to that decribed with respect to Figs. 1 and 2.

Referring more particularly to Figs. 4 and 5, it will be noted that, if line relay R420 is operated when a call is initiated from substation 400A or if line relay R440 is operated when a call is initiated from substation 400B, ground will be removed from the extra control contact 471 at either contacts 425 or 445.

If R420 operates, the start lead 481 is grounded over contacts 445 and 424; if R440 operates, it is grounded over contacts 444. Ground over conductor 481 operates start relay R525 which relay at contacts 526 prepares a circuit, for operating the allotter motor magnet M580 if the finder, upon which the allotter wipers are standing, is busy or is one of a group not to be taken into use. Assuming said finder—e. g. 402—is idle and available for use, M580 will not be operated; and relay R530 operates. Contacts 538 operate before contacts 536 to prepare a circuit for operating the finder motor magnet M460. Ground from the extra control contacts of the idle pairs of line circuits, over conductor 482, contacts 538 and 566, and conductor 489 will operate said magnet to advance the wipers until the calling line or the line paired with the calling line is seized. In either case, the extra control contact associated therewith will not be grounded and the finder wipers will stop.

If the non-calling line is the one seized, battery will not be found on the private contact associated therewith. Series relay R545, which is short circuited whenever ground is placed on conductor 482, is now operated over conductor 489 in series with the finder magnet M460, the magnet not operating. At contacts 547, R545 completes a circuit for operating the slow to operate relay R560. At contacts 561, R560 completes a circuit over conductor 490 for energizing magnet M460, and short circuits R545 over conductors 490 and 489 causing the latter to restore slowly. By slowly restoring R545, R560 is held operated long enough to assure a full energization of M460. R560 restores rapidly after R545 restores since its upper short circuiting winding is open at contact 562. M460 restores to advance its wipers, the series circuit for operating R545 being open during said restoration at self-interrupting contacts 461. An added precaution, to assure completely advancing the finder wipers to the next set of contacts before said circuit for operating R545 is again completed, has been taken by utilizing a slow to release relay R565, which operates in response to the operation of R560 and holds said operating circuit open at contacts 566 for a short time. As a result, R545 cannot falsely operate prior to the grounding of conductor 482 if said next contacts are associated with an idle line.

If the calling line had been seized, absence of ground on the extra control contact associated therewith would again result in R545 operating in series with M460; but now, R545 completes a circuit from ground at contacts 546 over conductor 488 to battery on the cutoff relay associated with said calling line for operating relay R550. The cutoff relay does not operate due to the high resistance winding of R550; but R550, which is pre-energized over its lower winding, operates contacts 552 rapidly to prevent the operation of R560 and, at contacts 551, grounds conductor 487 to operate the finder switching relay R450. The cutoff relay will be operated by ground over conductor 491 and contacts 553; the line relay and the allotter will be restored to normal; and the equipment will be ready for dialing.

While there has been described what is at present considered to be the preferred embodiment of the invention, it will be understood that said embodiment is given by way of example and that various modifications thereof may be made; and it is contemplated to cover in the appended claims all such modifications as fall within the true spirit and scope of the invention.

What is claimed is:

1. In a telephone system having a plurality of allotters of the non-homing type, a plurality of groups of finders available to each allotter in a definite order of priority, certain finders accessible to one allotter being multipled with finders available to other allotters, means in said one allotter for selecting an idle one of the finders accessible thereto, a calling line accessible to said one finder, means whereby said first means is operated in response to a call initiated over said calling line, means in each allotter for preventing the selection of all finders in a group available thereto other than that group having first priority, and means whereby said last means is operated and effective if a finder in a group of preceding priority and all finders multipled therewith are idle.

2. A combination as claimed in claim 1 wherein said third means comprises a motor magnet and a circuit, including each one of a plurality of permanently marked bank contacts and a test wiper having access to said contacts, for operating said motor magnet.

3. In a telephone system having a plurality of allotters of the non-homing type, a plurality of groups of finders available to each allotter in a definite order of priority, certain finders accessible to one allotter being multipled with finders available to other allotters, means in said one allotter for selecting an idle one of the finders accessible thereto, a calling line accessible to said one finder, means whereby said first means is operated in response to a call initiated over said calling line, a trunk available to each finder and to any finders multipled therewith, a plurality of normally closed test circuits in said allotter for determining the group to which calls will be routed, each circuit corresponding to one of said groups other than that group having first priority of use, means whereby each of said closed test circuits prevents finders in the group corresponding thereto from being taken into use, means for opening each of said circuits, and means whereby said last means opens one of said circuits when the trunks available to all finders in groups of preceding priority are busy, the opening of said one test circuit rendering the group of finders corresponding thereto available for use.

4. In a telephone system wherein a plurality of groups of numerical switches are accessible for use in a definite order of priority, in which order said groups are accessible from a successively greater number of groups of lines, an allotter of the non-homing type serving each of said groups of lines, a plurality of groups of finders accessible to one of said allotters, certain of said finders in each group being multipled with finders accessible to other allotters, a numerical switch available to each finder and to any finders multipled therewith, means in each allotter for selecting an idle one of the finders accessible thereto, means whereby said first means is operated in response to a call initiated over a line served by the allotter, means in each allotter for preventing the selection of all finders in a group other than that group having first priority, and means whereby said last means is operated if a numerical switch available to a finder in a group of preceding priority is idle.

5. In a telephone system wherein a plurality of groups of finders are available to each allotter in a definite order of priority, an allotter of the non-homing type, certain finders accessible to said allotter being multipled to finders available to other allotters, a calling line served by said allotter, means in said allotter for selecting an idle finder available thereto, means whereby said last means is operated in response to a call initiated over said calling line, group skipping circuits in said allotter for each group of finders available thereto other than that group having first priority, and means whereby each of said circuits is completed to cause the allotter to skip over all finders in the respective group if a finder in a group of preceding priority and all finders multipled therewith are idle.

6. In a telephone system wherein a plurality of groups of numerical switches are accessible for use in a definite order of priority, in which order said groups are accessible from a successively greater number of groups of lines, an allotter serving each group of lines, a switching means in each allotter for each group of switches other than that group having first priority of access, for rendering each idle switch in its respective group available for use; and means whereby each circuit means is operated only when all switches in groups of preceding priority are in use.

7. In a telephone system having a plurality of allotters of the non-homing type, a plurality of groups of finders available to each allotter in a definite order of priority; certain finders accessible to one allotter being multipled with finders available to other allotters; means in said one allotter, including a test wiper and a row of bank contacts accessible thereto, for skipping over all busy finders and all finders multipled with busy finders; group skipping circuits in said one allotter for each group of finders accessible thereto other than that group having first priority of access, each of said circuits including a test wiper and a row of bank contacts accessible thereto; means, including said group skipping circuits, for skipping over finders in a group if a finder in a group of preceding priority and all finders multipled therewith are idle, whereby finders in only one of the groups accessible to said one allotter are available for use at any particular time; a calling line accessible to the finders available to said one allotter; and means whereby both of said means are operated in response to the initiation of a call over said calling line to cause the allotter to select an idle finder in the one group available when the call is initiated.

8. In an allotter of the non-homing type having access to a plurality of groups of finders, means, including one test wiper, for skipping over all busy finders; a normally completed group skipping circuit, including a test wiper, for each of said groups of finders; means, including each of said completed circuits, for skipping over all finders in the respective group; means for opening each of said circuits, thereby to render the finders in the respective group available for use; incoming conductors in said allotter over which calls are received; and means whereby said first and second means are operated in response to a call received over said conductors to cause the allotter to select an idle finder in a group available for use.

9. In an allotter as claimed in claim 8 and wherein said groups of finders are accessible in a definite order of priority, means whereby said third means is operated to open one of said circuits only if all finders in groups of preceding priority are in use.

10. In a telephone system having a plurality of allotters, groups of first, second and third choice finders; one of said allotters having access to said finders, each of said second and third choice finders being multipled with finders accessible to other allotters; a trunk individual to each of said first choice finders; a trunk available to each second and third choice finder in common with finders multipled therewith; a line served by said one allotter; said one allotter comprising means, including one test wiper, for selecting a finder which is connected to an idle trunk; first and second circuit means, each including a wiper and permanently marked bank contacts accessible thereto, for preventing respectively the selection of second and third choice finders for use; means whereby said first circuit means is completed if one of said first choice finders is idle and whereby said second circuit means is completed if a trunk connected to said first or second choice finders is idle, whereby only one of said groups will have idle finders available for use at any particular time; and means whereby said selecting means is operated in response to a call initiated over said line to select a finder from the one group available for use.

11. In a telephone system having a plurality of groups of lines and an allotter serving each of said groups; one of said allotters having access to groups of first, second and third choice finders, each of said second and third choice finders being multipled with finders accessible to other allotters; means, including one test wiper, for skipping over busy finders and finders multipled with a busy finder; means, including a second test wiper, for skipping over second choice finders; a group relay; normally closed contacts on said relay for preparing said second means; means for operating said group relay; means whereby said third means is operated while all of said first choice finders are busy; means whereby said contacts are operated in response to the operation of said relay to prevent said second means from skipping over second choice finders; means, including a third test wiper, for skipping over third choice finders; another group relay; normally closed contacts on said other relay for preparing said sixth means; means, including contacts on said first-mentioned group relay, for operating said other group relay; means whereby said last means is operated while all first choice finders and all second choice finders or ones multipled therewith are busy; means whereby said second-mentioned contacts are operated in response to the operation of said other relay to prevent said sixth means from skipping over third choice finders, all of said relays, contacts and means cooperating so that only one of said finder groups is available for use at a particular time; a line served by said one allotter; means whereby said first, second and sixth means are controlled in response to a call initiated over said line to select an idle finder in the group available for use.

12. In an automatic switch having wipers with a plurality of positions, first and second test contacts engageable by the wipers in each position, first and second electric potentials connectable to said first and second test contacts respectively, means for advancing the wipers to succeeding positions, means for stopping the wipers, means whereby said last means is operated in response to the wipers engaging one of said first test contacts to which said first potential is connected, switch through means, means whereby said last means is operated if said second potential is connected to the second contact in the position at which said wipers have stopped, means for again advancing the wipers, and means whereby said last means is operated if said second potential is not connected to said last-mentioned contact.

13. In a telephone system, an automatic switch having wipers including a pair of test wipers, lines having contacts accessible to said wipers and having various potentials connected thereto dependent on their condition, means for causing said switch to move its wipers over the contacts of said lines to test their condition, testing means controlled over one of said test wipers and operated or not dependent on the presence or absence of one of said potentials on said contacts to either move the wipers past said contacts or pause thereon, and additional testing means controlled over the other test wiper dependent upon the presence or absence of another of said potentials on said contacts for either completing a connection to said line or moving the wipers past said contacts.

14. In a telephone system, a plurality of lines terminating in contacts, a finder switch with wipers having access to the contacts of said lines and a magnet for moving said wipers, means operated when a call is initiated over one of said lines for starting said finder and for marking said line, said marking consisting of the removal of a normal ground connection from one of the contacts of said calling line and the establishment of a battery connection to another contact of said calling line, a circuit for said magnet completed whenever said wipers engage a contact having said normal ground connected thereto to operate said magnet and thereby move the wipers, means operated whenever a marked line with no normal ground is engaged by the wipers for opening said circuit, and additional means operated only when said wipers also engage a contact having said battery connected thereto for completing a connection to said line.

15. In a telephone system, a plurality of line circuits, an idle condition marking potential for each line circuit, a calling condition marking potential for each line circuit, a finder switch, a driving magnet for said switch, wipers for said switch, contacts for each line circuit accessible to said wipers, an allotter, a first circuit means including said idle line marking potential operated and effective for operating said magnet to move said wipers from the contacts of an idle line circuit, a second circuit means included in the allotter and operated in response to the wipers engaging contacts having said calling condition marking potential connected thereto for preventing movement of said wipers from the contacts of a calling line circuit, and means in the allotter for operating said magnet to move said wipers from the contacts of a line circuit having neither of said marking potentials connected thereto.

16. In a telephone system having a plurality of subscriber lines and one potential normally connected to each idle one of said lines, a finder including wipers and having access to said lines, a calling one of said lines, means for removing said one potential and for establishing two other potentials to mark said line, means whereby said first means is operated responsive to a call initiated over said calling line, means including a magnet for advancing said wipers, means whereby said last means is operated in response to the finder engaging a line marked by said one potential, means for preventing further operation of said third means and for switching through connections in the finder, and means whereby said last means is operated only when the finder engages a line marked by both of said other potentials.

17. With a combination as claimed in claim 16, means whereby said third means is operated to advance the wipers when a line marked by only one of said other potentials is engaged by the finder.

18. In a telephone system having a plurality of subscriber lines over which calls are initiated, a finder having access to said lines, said finder including wipers and first and second test contacts connected to each line and accessible to said wipers, one electric potential normally connected to the first test contact of each idle line, means operated responsive to a call initiated over a calling one of said lines for removing said one condition from the first test contact connected to the calling line and for establishing another electric potential on the second test contact connected to the calling line, means operated and effective each time said wipers engage a first test contact having said one potential connected thereto for advancing said wipers one step, said wipers momentarily halting when said wipers engage a first test contact having said one potential removed therefrom, means operated and effective in response to said wipers engaging a first contact and second contact having neither of said two potentials connected thereto for again advancing the wipers one step, and means operated and effective only in response to the wipers engaging a first test contact having said one potential removed therefrom and the second test contact having said other potential connected thereto for switching through connections to the calling line.

19. In an automatic switch, a pair of test wipers, a plurality of bank contacts accessible to each wiper, means for advancing said wipers over said contacts, means whereby said advancing means is operated when a particular electric potential is connected to a contact upon which one of said wipers is standing, means for switching through connections, means whereby said switching means is operated when a particular electric potential is connected to the contact upon which the other wiper is standing if said first-mentioned potential is not connected to said first-mentioned contact, and means whereby said advancing means is also operated if neither of said potentials are connected to said first-mentioned contact and said second-mentioned contact.

20. An automatic switch as claimed in claim 19 wherein said first-mentioned potential is negative ground and said second-mentioned potential is positive battery.

21. In a telephone system having a plurality of subscriber lines over which calls are initiated, a finder having access to said lines, said finder having first and second test contacts for each line and a pair of test wipers having access to said test contacts, a calling one of said lines, means for placing a particular potential on the first test contact of said calling line and a particular potential on the second test contact of the calling line, means whereby said last means is operated in response to the initiation of a call over said calling line, means for moving said wipers, means whereby said moving means is started in response to the initiation of said call, means for stopping the wipers, means whereby said stopping means is operated only when one of said wipers encounters said first-mentioned potential on a first test contact, a trunk connected to said finder, means in said finder for switching through connections to said trunk, means whereby said switching means is operated if the other wiper encounters said second-mentioned potential on the second test contact of the line upon which the wipers have stopped.

22. With a combination as claimed in claim 21, means for again moving said wipers, and means whereby said last means is operated if said second-mentioned potential is not connected to said last-mentioned second test contact.

23. In a telephone system, a switch having a pair of test wipers, a plurality of bank contacts accessible to each wiper, certain potentials connected to some of said bank contacts, means in said switch for advancing said wipers over said contacts, means whereby said advancing means is operated when one of said potentials is connected to a contact upon which one of said wipers is standing, means in said switch for switching through connections, means whereby said switching means is operated when one of said potentials is connected to the contact upon which the other wiper is standing but only if said first-mentioned one potential is not connected to said first contact, means whereby said advancing means is operated if neither of said potentials is connected to said first contact and said second contact, and means for controlling the potentials connected to said contacts.

24. In a telephone system wherein the wipers of a finder are advanced over contacts accessible thereto by a motor magnet under the control of an allotter to find a calling line, a pair of test wipers in said finder, a series relay in the allotter, a plurality of lines accessible to said finder, a pair of test contacts in the finder for each line, means for removing a normally connected potential from one of the test contacts of the calling line and for establishing a particular potential on the other test contact of the line, means for operating said relay, means for preventing the operation of said relay and for operating said motor magnet, means whereby said last means is completed only if one of said test wipers engages a test contact having said normally connected potential connected thereto, a slow to operate relay in the allotter, circuit means for operating said slow to operate relay, means whereby said circuit means is completed in response to an operation of said series relay, contacts on said slow to operate relay, means whereby said last mentioned contacts are operated in response to an operation of said slow to operate relay to again operate the motor magnet, switching means in the finder, a test relay in the allotter, means for operating said test relay, means whereby said last means is completed in response to an operation of the series relay only if the other test wiper engages a test contact having said second-mentioned potential connected thereto, contacts on said test relay, and means whereby said test relay contacts are operated in response to an operation of the test relay for operating said switching means to switch through connections in the finder and for opening said circuit means before said slow to operate relay can operate, all of said relays, contacts, and means cooperating to stop the finder and switch through connections therein only when said wipers simultaneously engage contacts from which said first-mentioned potential has been removed and to which said second-mentioned potential has been connected.

25. The combination claimed in claim 24 together with a slow to release relay operated responsive to the operation of said slow to operate relay for restoring said series relay and for rendering said series relay operating means ineffective, whereby a false reoperation of said series relay before the test wipers engage the next test contacts is prevented.

26. For use in a telephone system, a finder switch having a pair of test wipers, a plurality of lines accessible to the finder and each having a pair of test contacts accessible to said test wipers, means operated responsive to a call initiated over one of said lines for connecting calling marking potentials to both of its test contacts, an allotter having access to said finder, a magnet for advancing said wipers, an operating circuit for the magnet including self-interrupting contacts on the magnet, means in the allotter operated in response to the initiation of said call for completing said circuit to operate the magnet, a partially-energized interrupter relay in the allotter operated responsive to one of the test wipers engaging a contact having one of the calling marking potentials connected thereto for opening said circuit to prevent further operation of the magnet, an alternate operating circuit for the magnet, a second relay in the allotter operated responsive to the operation of the interrupter relay for completing said alternate operating circuit, and a pre-energized test relay operated in response to the other test wiper engaging a contact having the other calling marking potential connected thereto for preventing said completion of the alternate operating circuit of the magnet, whereby the wipers of the finder will be advanced until both of said test wipers engage a pair of contacts having said calling marking potentials connected thereto.

27. The combination claimed in claim 26 wherein said second-mentioned means includes a slow to operate relay, whereby the wipers will not be advanced if they are engaging the test contacts of a calling line when the call is initiated.

28. In a telephone system having a plurality of subscriber lines arranged in pairs, a test contact individual to each line, a test contact common to both lines in each pair, an automatic switch with wipers having access to said test contacts, marking potentials connected to said test contacts in accordance with their condition, means for causing the switch to move its wipers over the contacts of said lines to test their condition, testing means controlled over the wiper having access to said common test contact and operated or not dependent upon the presence or absence of one of said marking potentials on said common test contact to either move the wipers past said contact or to stop thereon, and additional testing means controlled over the test wipers having access to said individual test contacts and operated or not dependent upon the presence or absence of another of said marking potentials on said individual test contacts for either completing a connection to one of said lines or moving the wipers past said contacts.

References Cited in the file of this patent

UNITED STATES PATENTS

| | | |
|---|---|---|
| 1,902,186 | Saunders | Mar. 21, 1933 |
| 2,113,119 | Taylor et al. | Apr. 5, 1933 |
| 2,688,660 | Buchner | Sept. 7, 1954 |